United States Patent
Coleman et al.

(10) Patent No.: US 7,762,526 B2
(45) Date of Patent: Jul. 27, 2010

(54) PENDULUM VALVE HAVING INDEPENDENTLY AND RAPIDLY CONTROLLABLE THETA-AND Z-AXIS MOTION

(75) Inventors: Nate Coleman, San Diego, CA (US); John Slaney, San Diego, CA (US); Sean Mallory, San Diego, CA (US); Per Cederstav, San Diego, CA (US); David Kruse, San Diego, CA (US); William Ballard, San Diego, CA (US); Robert Woods, San Diego, CA (US)

(73) Assignee: Nor-Cal Products, Inc., Yreka, CA (US)

( * ) Notice: Subject to any disclaimer, the term of this patent is extended or adjusted under 35 U.S.C. 154(b) by 321 days.

(21) Appl. No.: 11/895,897

(22) Filed: Aug. 27, 2007

(65) Prior Publication Data

US 2009/0057596 A1 Mar. 5, 2009

(51) Int. Cl.
*F16K 3/10* (2006.01)

(52) U.S. Cl. ............... 251/187; 251/204; 251/229; 251/259; 251/301

(58) Field of Classification Search ............... 251/301, 251/187, 229, 203, 204, 193, 259, 148, 248, 251/250.5
See application file for complete search history.

(56) References Cited

U.S. PATENT DOCUMENTS

| | | | | |
|---|---|---|---|---|
| 3,505,888 A * | 4/1970 | Denkowski | ............... | 74/89.27 |
| 3,854,696 A * | 12/1974 | Keyes et al. | ............... | 251/163 |
| 4,346,728 A * | 8/1982 | Sulzer | ............... | 137/243.6 |
| 4,465,091 A * | 8/1984 | Keller | ............... | 137/243.6 |
| 4,770,392 A * | 9/1988 | Schmidt | ............... | 251/158 |
| 4,920,814 A * | 5/1990 | Espy | ............... | 74/89.3 |
| 5,005,805 A * | 4/1991 | Morris et al. | ............... | 251/229 |
| 5,178,185 A * | 1/1993 | Stehling et al. | ............... | 137/543 |
| 5,577,707 A | 11/1996 | Brida | ............... | 251/193 |
| 6,007,047 A * | 12/1999 | Phipps | ............... | 251/252 |
| 6,089,537 A | 7/2000 | Olmsted | ............... | 251/129.11 |
| 6,328,051 B1 | 12/2001 | Maher | ............... | 137/1 |
| 6,409,149 B1 | 6/2002 | Maher, Jr. | ............... | 251/328 |
| 6,464,203 B1 | 10/2002 | Ishigaki et al. | ............... | 251/326 |
| 6,534,793 B1 * | 3/2003 | Heritier-Best | ............... | 257/77 |
| 6,776,394 B2 | 8/2004 | Lucas | ............... | 251/259 |
| 6,994,317 B2 * | 2/2006 | Fischer | ............... | 251/193 |
| 2004/0069285 A1* | 4/2004 | Telep et al. | ............... | 123/568.23 |
| 2004/0124392 A1 | 7/2004 | Lucas | ............... | 251/251 |
| 2004/0256591 A1 | 12/2004 | Latzer et al. | ............... | 251/326 |
| 2005/0062007 A1 | 3/2005 | Fischer | ............... | 251/212 |
| 2005/0067603 A1 | 3/2005 | Lucas et al. | ............... | 251/326 |
| 2006/0226388 A1* | 10/2006 | Hiroki | ............... | 251/204 |

* cited by examiner

*Primary Examiner*—John Bastianelli
(74) *Attorney, Agent, or Firm*—Steins & Associates, P.C.

(57) ABSTRACT

A Pendulum Valve having Independently and Rapidly Controllable Theta- and Z-axis Motion. The valve actuator used in the present invention provides the benefit of wide open unrestricted flow of a pendulum valve coupled with the high-resolution and wide dynamic range flow throttling of a ball or butterfly valve. The actuator mechanism will include motor drives and associated control system so that the drives are closely coupled to give highly controlled motion. The drive assembly introduces a concentric shaft arrangement that, when coupled with the highly controllable motor drives, exploits a cam-follower arrangement to make the relative rotation between the two concentric shafts result in highly controlled theta and z-axis motion. Finally, the plate to seal spacing afforded is greater than previously possible with prior valve actuator mechanisms, thereby substantially reducing flow turbulence through the valve as the valve plate eclipses the valve ports.

20 Claims, 9 Drawing Sheets

PENDULUM VALVE HAVING INDEPENDENTLY AND RAPIDLY CONTROLLABLE THETA- AND Z-AXIS MOTION

BACKGROUND OF THE INVENTION

1. Field of the Invention

This invention relates generally to valves and actuators therefor and, more specifically, to a Pendulum-type Valve having Independently and Rapidly Controllable Theta- and Z-axis Motion.

2. Description of Related Art

Pendulum valves, also known as gate or slide valves are particularly suited for systems mandating large diameter flow conduits such as semiconductor manufacturing, thin film and vacuum process equipment. Specifically, in many such processes, the process chamber is placed under a vacuum condition prior to, during and after engaging in whatever process is conducted in the chamber. This typically involves the metered introduction of small amounts of certain gases into the rarified internal atmosphere (of the chamber) to achieve the required chemistry and pressure conditions within the chamber. In any such process, the ability to rapidly evacuate (empty) the process chamber of gaseous molecules such as process byproducts and other chemicals, is of critical importance. In order to achieve such precise control and rapid evacuations, a high-throughput-volume vacuum pump is connected to the exhaust of the process chamber by large diameter piping; the vacuum pump is "connected" and "disconnected" from the process chamber by a valve capable of opening as wide as the piping bore (to eliminate any flow restrictions), and then close very tightly to precisely increase or maintain desired pressure, and to completely isolate the vacuum pump from the chamber.

The pendulum valve has historically been the valve best suited for isolating the vacuum pump from the process chamber because it can open wide until the valve plate is completely out of the process flow path (to allow for unrestricted flow and maximum conductance), and can then be closed and sealed tightly to achieve a secure and complete isolation between the vacuum pump and the vacuum chamber.

But as critical as a fully opening and closing (sealing) valve is to the aforementioned vacuum processes, of even higher importance is the ability to precisely control (throttle) the vacuum level (pressure) in the vacuum chamber within certain desired parameters. These parameters primarily include time, accuracy, stability, and flow symmetry in the vacuum chamber, all of which are strongly influenced by the actuation ability and flow symmetry achieved through the pendulum valve.

In order to clarify valve plate positioning for later reference herein, the valve plate, while having a multitude of optional positional locations within the valve housing, can be described as having three cardinal locations: a first open position where the valve plate is completely removed from the flow path through the valve housing, and the plate has moved as far away from the valve seat in the Z-axis direction as it can; a second open position where the valve plate is completely eclipsing the flow path, with the valve plate remaining at maximum z-axis stroke away from the valve seat in the Z-axis direction as it can; and a third closed position where the valve plate is completely eclipsing the flow path and the valve plate is being pressed against the valve seat in the Z-axis direction with all available sealing force. Moving from the first open position to the second open position involves movement of the valve plate solely in the theta direction, while moving from the second open position to the third closed position involves movement of the valve plate solely in the Z-direction.

There are several drawbacks inherent to the conventional "throttling" or control pendulum valve design and actuator mechanism, several of which make meeting all control and sealing parameters particularly challenging. In the conventional pendulum valve, there are essentially two discrete valve positions—full open and full closed (sealed). In addition, a multitude of intermediate positions can be effected by using a variable position valve actuator, such as a motor, which can position the valve plate in positions between full open and full closed so as to achieve the desired flow throttling. In such a manner, the valve plate swings open and closed in what is sometimes referred to in the "theta" direction. Once the valve plate is fully covering the flow path, it then moves in the "z" direction, which is a direction in line with the flow path, until the valve plate seals against the valve housing. It is in this small axial motion that the majority of the process control at low absolute pressure (high vacuum) and low flow of metered gases occurs.

Conventionally, there can be no z-direction control of the plate until the theta direction of motion has distinctly terminated with the valve plate in exactly the near-closed (theta) position, because there needs to be enough of a gap between the valve plate and the valve housing to allow for the plate to swing freely through the entire theta path. Since the two motions cannot conventionally be actuated simultaneously and independently, there is a transition point between the theta motion path and the z motion path that is characterized by a sharp and sudden change in the valve's flow throttling capability (valve conductance), and the transition also typically includes an undesirable non-controllable flat regime through which active flow throttling cannot be effected. This non-linear valve conductance is shown in FIG. 9 and depicts the relationship between the pendulum valve plate position and the resultant vacuum chamber pressure. From this, it is evident that effective vacuum chamber pressure control relies heavily on three factors. They are:

a) the ability to move the valve plate quickly across the theta range of the valve stroke, since chamber pressure is highly insensitive to valve position in the theta valve stroke range;

b) the ability to produce active control along the z-axis, since this is where the majority of the controllable conductance can be realized. In addition, control along this axis has to be highly precise since chamber pressure is highly sensitive to valve position in the z-axis valve stroke range; and c) the ability to reduce or eliminate the non-controllable flat regime near the transition between the theta- and z-motion respective stroke ranges.

The inability of conventional valve geometry and actuation design to independently and simultaneously control theta and z-axis motion creates a severe limitation on the dynamic control range of the valve and/or linearity of control across the addressable stroke of the valve.

With the conventional pendulum valve actuation and geometry, then, the user must accept nonlinear control characteristics and/or limited dynamic control range (especially when near-sealed in the z-axis direction) common with these types of valves that transition where the theta motion sequences to the z-axis motion and eventually seals.

What is needed is an improved pendulum valve and actuator mechanism and methodology that combines the high open conductance characteristics of a convention pendulum valve with improvements in its throttling capability garnered by simultaneous yet independent theta path and z-axis motion control. Further improvements should include a light and nimble plate design allowing for the fastest possible theta path motion, as well as valve plate and body design leading to maximum possible stroke length in the z-axis direction (and the ability to throttle there within).

Furthermore, it is desirable that the z-axis stroke (plate-to-flange travel distance when theta is in the closed or fully eclipsed position) be sufficiently large that conductance is uniform around the plate and that the majority of the control range be in the z-axis; since theta-path control yields non-uniform flow through the throat of the valve housing. Also, control in the z-axis direction produces less vibration than controlling in the theta-path direction because the moment of inertia about the z axis (torque=inertia*angular acceleration) is substantially greater than inertia created in the z axis (force=mass*linear acceleration).

SUMMARY OF THE INVENTION

In light of the aforementioned limitations and inherent problems associated with the prior devices and systems, it is an object of the present invention to provide a Pendulum Valve having Independently and Rapidly Controllable Theta- and Z-axis Motion. The valve actuator used in the present invention should provide the benefit of wide open unrestricted flow of a pendulum valve coupled with the high-resolution and wide dynamic range flow throttling of a ball or butterfly valve. The actuator mechanism should include motor drives and associated control system to closely couple the drives to give highly controlled motion. The drive assembly should introduce a concentric shaft arrangement that, when coupled with the highly controllable motor drives, can exploit a cam-follower arrangement to make the relative rotation between the two concentric shafts result in highly controlled theta and z-axis motion. Finally, the plate to seal spacing should be greater than previously possible with prior valve actuator mechanisms, in order to substantially reduce turbulence in the flow through the valve as the valve plate eclipses the valve ports.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide a Pendulum Valve having Independently and Rapidly Controllable Theta- and Z-axis Motion.

Figure 1:
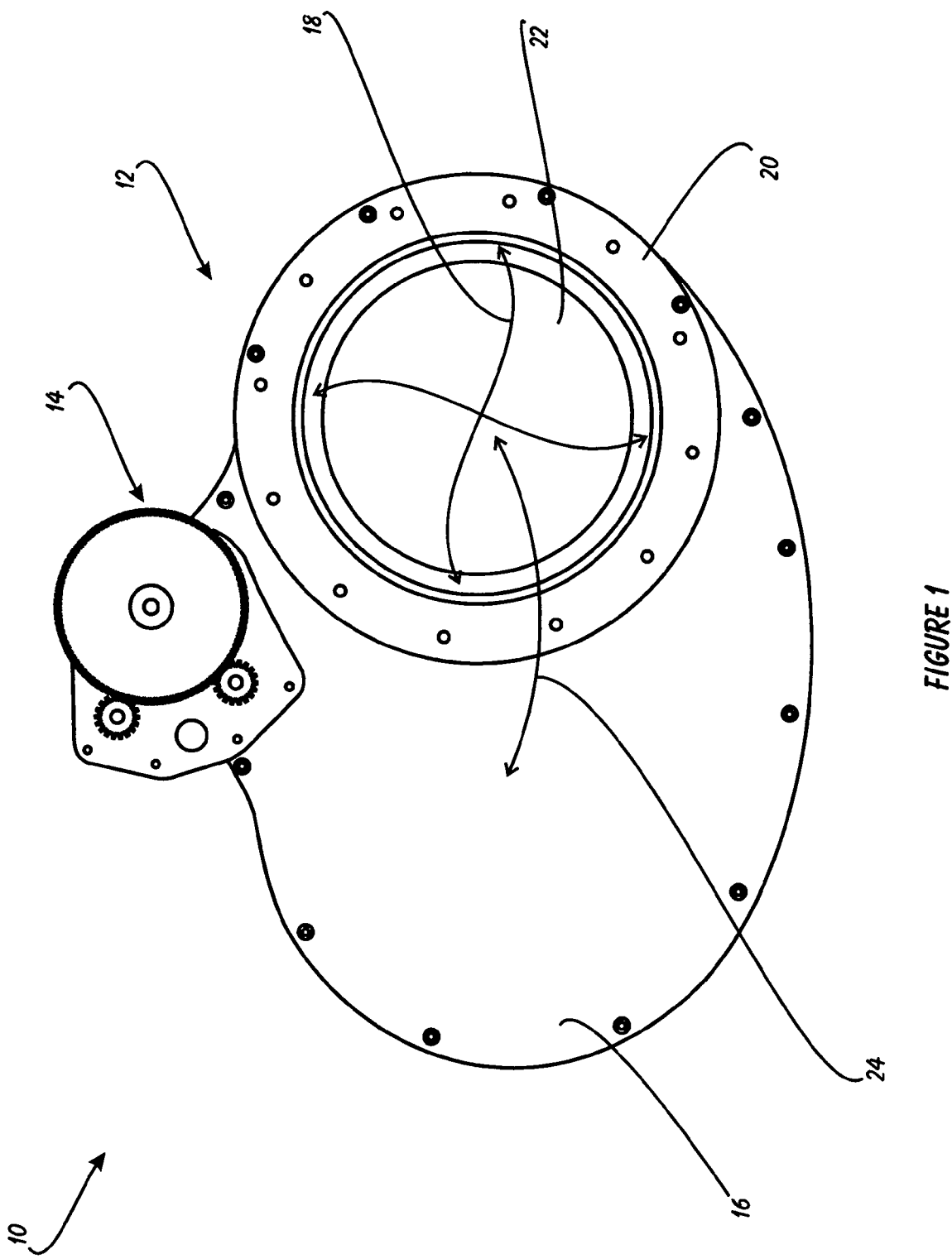
FIG. 1 is a top view of a preferred embodiment of the pendulum valve assembly of the present invention.

The present invention can best be understood by initial consideration of FIG. 1. FIG. 1 is a top view of a preferred embodiment of the pendulum valve assembly 10 of the present invention. The assembly 10 consists of two major functional parts, the pendulum valve 12, and the plate actuator assembly 14.

The pendulum valve 12 has a large housing 16 defined by a first channel opening 18 and a second channel opening (not shown). These two openings are in axial alignment on the two sides (top and bottom in this depiction) of the housing 16, and are each bounded by a flange 20. The flanges provide a valve attachment point for the exhaust system piping and process chamber interface.

The valve plate 22 is shown here in the closed position. In this position, the plate 22 completely covers the two flow channel openings 18 but does not seal or completely isolate the vacuum pump from the chamber. When being opened wide, the valve plate 22 will travel through theta movement path 24 until the plate 22 does not cover the openings 18. The z-direction is that movement path wherein the plate 22 moves closer to or further away from the housing 16 (closer to or away from the reader in the depiction of this FIG. 1). The simultaneous or sequential movement of the plate 22 through both the theta and the z directions is made possible via the plate actuator assembly 14 of FIG. 2.

Figure 2:
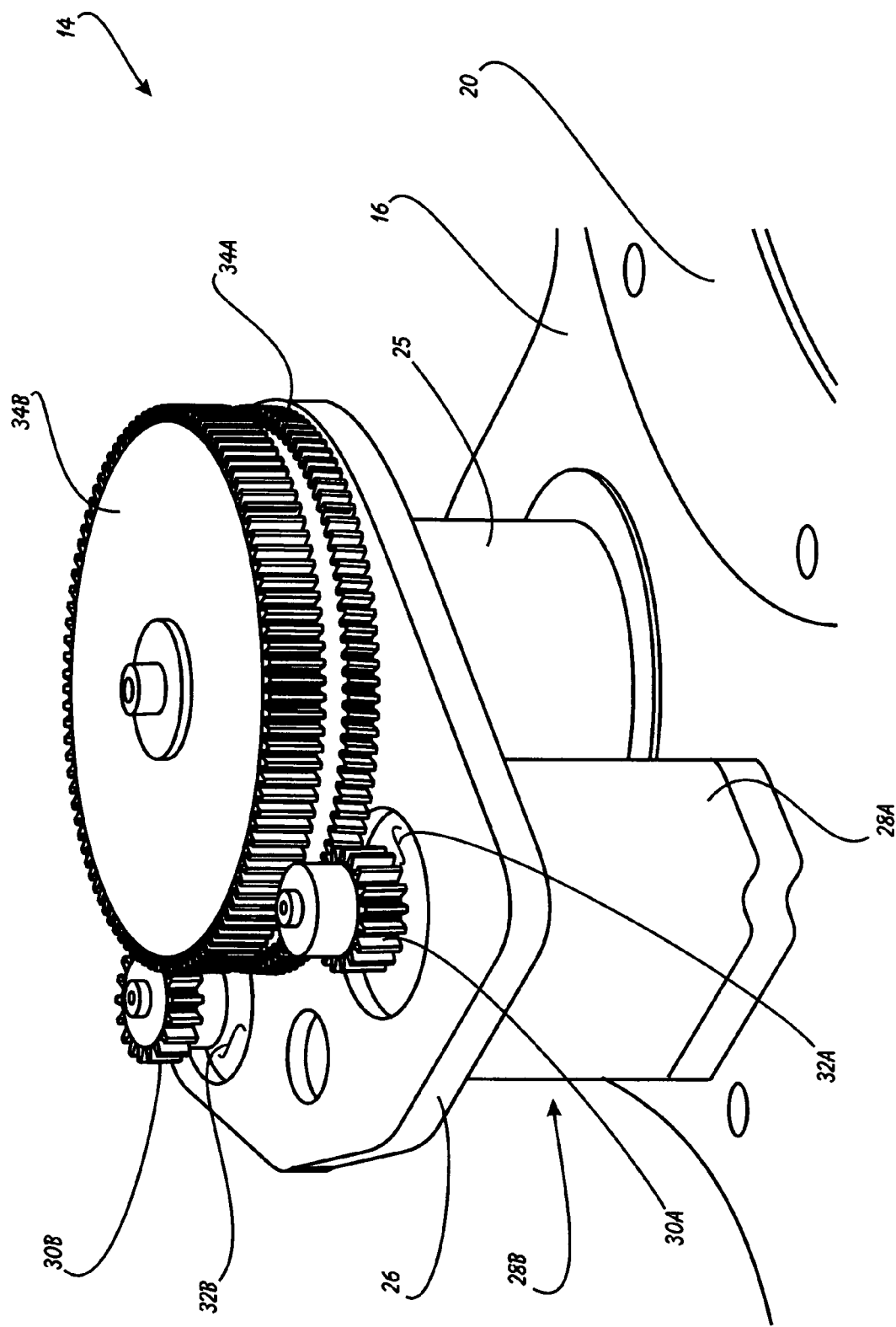
FIG. 2 is a perspective view of the plate actuator assembly of the valve assembly of FIG. 1.

FIG. 2 is a perspective view of the plate actuator assembly 14 of the valve assembly of FIG. 1. The assembly 14 has a motor base plate 26 attached to the valve housing 16 via a shaft assembly housing 25. The shaft assembly housing 25 houses the shaft(s) that actually move the valve plate.

First and second drive motors 28A and 28B (not shown) are attached to the motor base plate 26 such that their respective drive shafts extend through first and second pinion apertures 32A and 32B. A first pinion gear 30A is attached to the shaft of the first drive motor 28A. A second pinion gear 30B is attached to the shaft of the second drive motor 28B. As used herein through this specification and claims, the term "pinion" is intended to denote a gear that is the "driving" gear in a gear train. The term "spur" is intended to denote a gear that is the "driven" gear in a gear train. Neither of these terms denotes a relative size difference between any of the gears described herein.

The first pinion gear 30A is oriented so that it engages a first spur gear 34A. A second spur gear 34B is located adjacent to, and in axial alignment with, the first spur gear 34A. The second pinion gear 30B is oriented so that it engages the second spur gear 34B. It should be apparent that the first drive motor 28A drives the first spur gear 34A and the second drive motor 28B drives the second spur gear 34B. The reader should note that the gear teeth of the second pinion gear 30B are actually wider than the width of the gear teeth of the second spur gear 34B. The reason for this feature will become apparent below in connection with the descriptions of other drawing figures. For now, we will turn to FIG. 3 to continue to examine the unique features of this invention.

Figure 3:
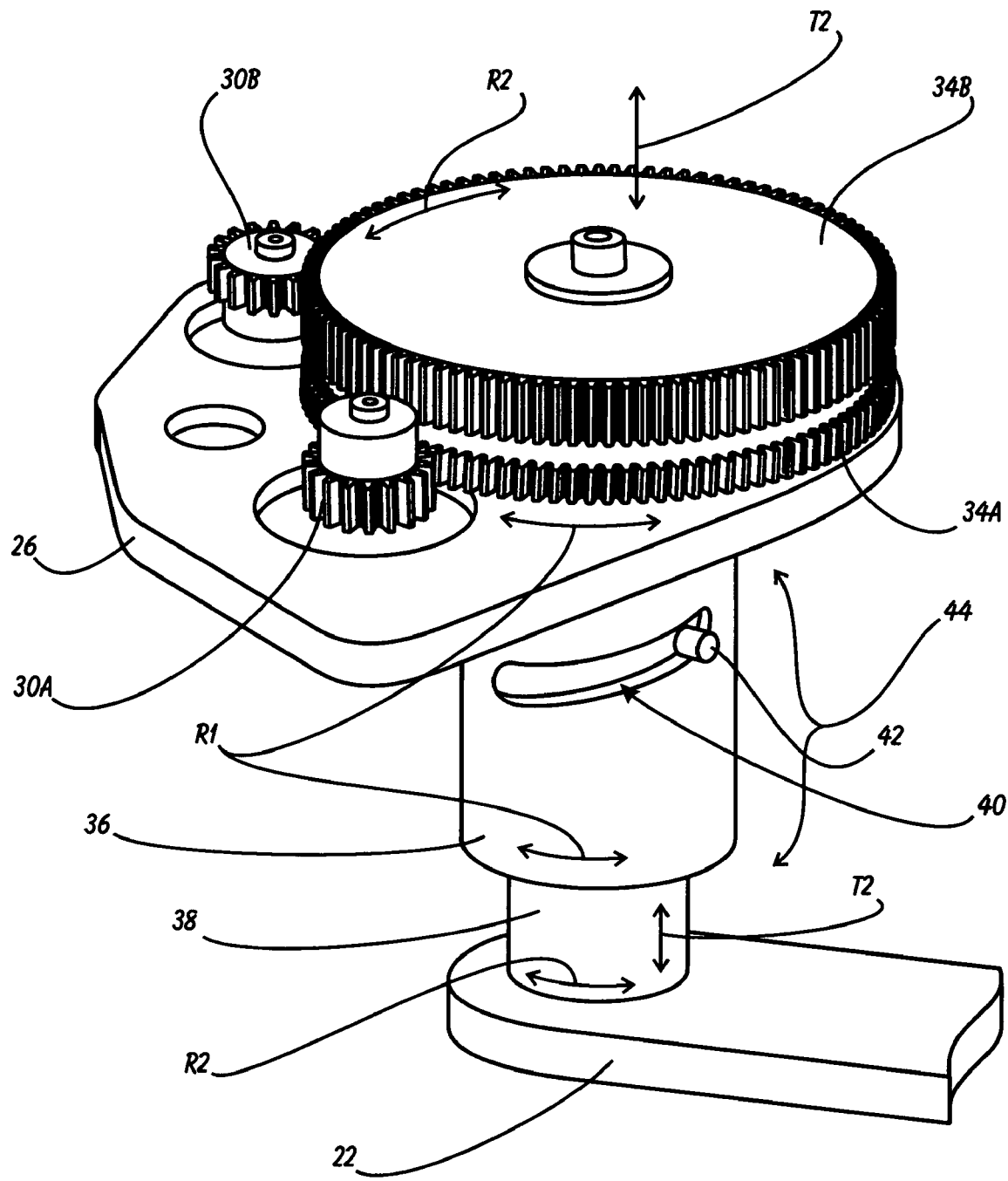
FIG. 3 is a perspective view of the plate actuator assembly of FIG. 2 further depicting the actuating shafts.

FIG. 3 is a perspective view of the plate actuator assembly 14 of FIG. 2 further depicting the actuating shafts. The assembly 14 utilizes a unique arrangement of shafts, with each shaft being independently rotatable. This unique arrangement of shafts is the concentric shaft assembly 44. The concentric shaft assembly 44 is a sleeve shaft 36 with a center shaft 38 inserted therein. The sleeve shaft 36 is attached to, and driven by, the first spur gear 34A. The center shaft 38 is attached to, and driven by, the second spur gear 34B.

What is very unique about the concentric shaft assembly 44 is the simultaneous interdependence and independence of the motions of the two shafts 36 and 38. This interdependence/independence is created via the operation of the follower roller 42 riding within the cam groove 40 formed through the wall of the sleeve shaft 36. The follower roller 42 is attached to the center shaft 38.

As the first spur gear 34A is moved through rotation R1, the sleeve shaft 36 (which is directly connected to the first spur gear 34A) will also move through rotational motion R1. Similarly, when the second spur gear 34B is moved through rotation R2, the center shaft (which is directly connected to the second spur gear 34B) will also move through rotational motion R2. Since the valve plate 22 is connected to the center shaft 38, the valve plate 22 will move through rotational movement R2 when the center shaft 38 and second spur gear 34B move rotationally. What is unique is that the center shaft 38 can also move in the translational movement direction T2 as will now be described.

If the sleeve shaft 36 and the center shaft 38 are rotated synchronously and at the same speed and same rotational direction, then the follower roller 42 will exhibit no motion in relation to the cam groove 40 (since both are moving in the same direction at the same rate). If, for example, the sleeve shaft 36 is prevented from rotating while the center shaft 38 is rotated, there will be relative motion between the follower roller 42 and the cam groove 40. This relative motion will cause the roller 42 to move along the length of the groove 40. As the roller 42 moves along the groove 40, it will drive the center shaft 38 to move in translational direction T2. Of course, the second spur gear 34B will also be caused to move in the translational direction T2. In this scenario, the valve plate 22 will not only rotate (R2), but will also translate (T2).

If, alternatively, the center shaft 38 is prevented from rotating (R2=0) while the sleeve shaft is rotated (R1>0 or R1<0), there will be no rotational movement of the valve plate 22 (since R2=0), and there will only be translational movement T2. It is through the infinite available combinations of R1 and R2, together or independently, that the high level of control of the valve plate theta and z-direction movement is achieved.

An additional benefit and enabling technology of this innovation is obtained through the advanced, closed-loop motor control of the two bi-polar stepper drive motors. Not only is a high level of precision and motor synchronization available for the movement of the valve plate 22, but the drive motors can actually be independently controlled to slightly oppose one another in order to eliminate the negative control effects of valve backlash and hysteresis on the performance of the plate's movement.

Figure 4:
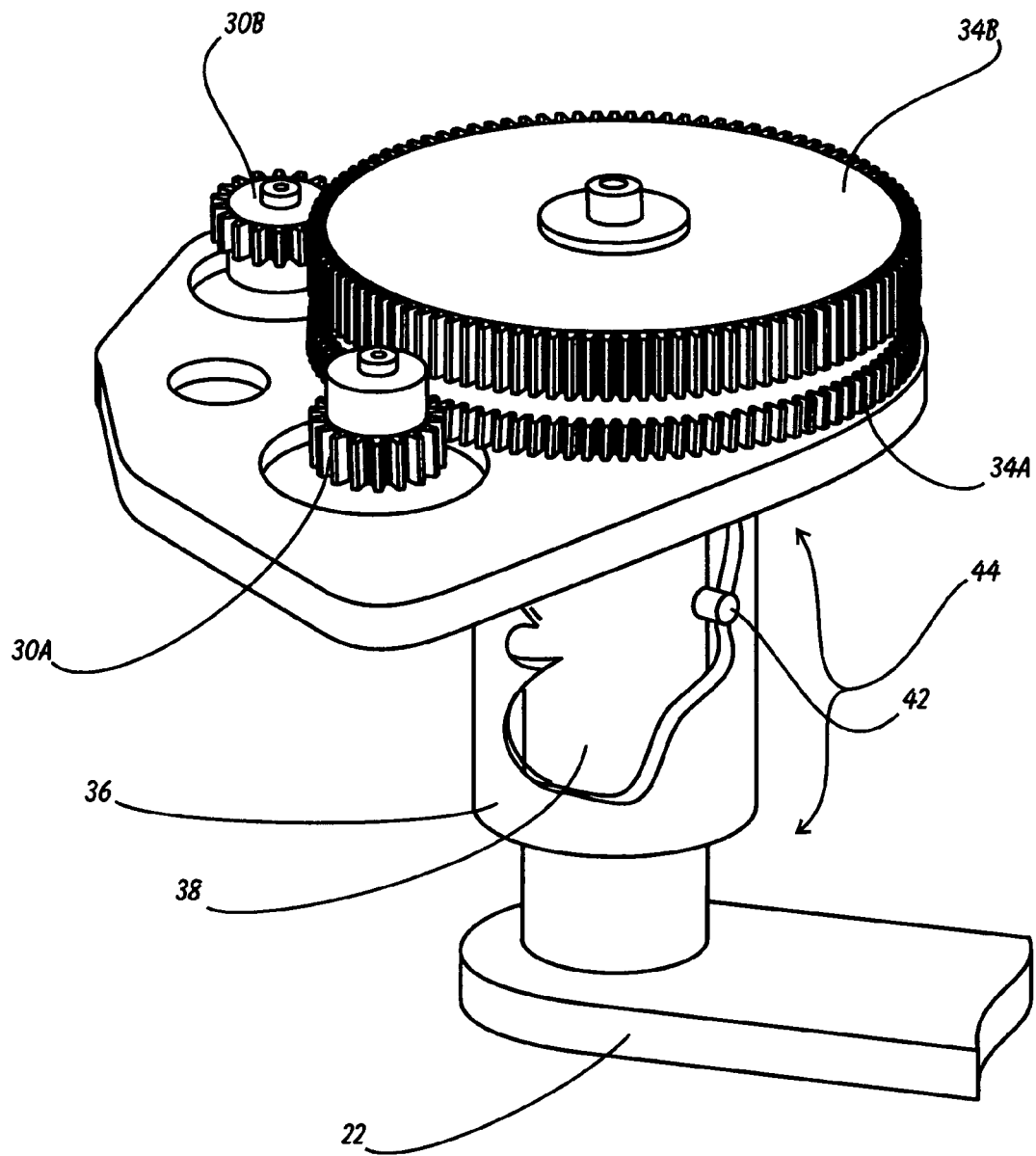
FIG. 4 is a partial cutaway perspective view of the assembly of FIG. 3.
Figure 5:
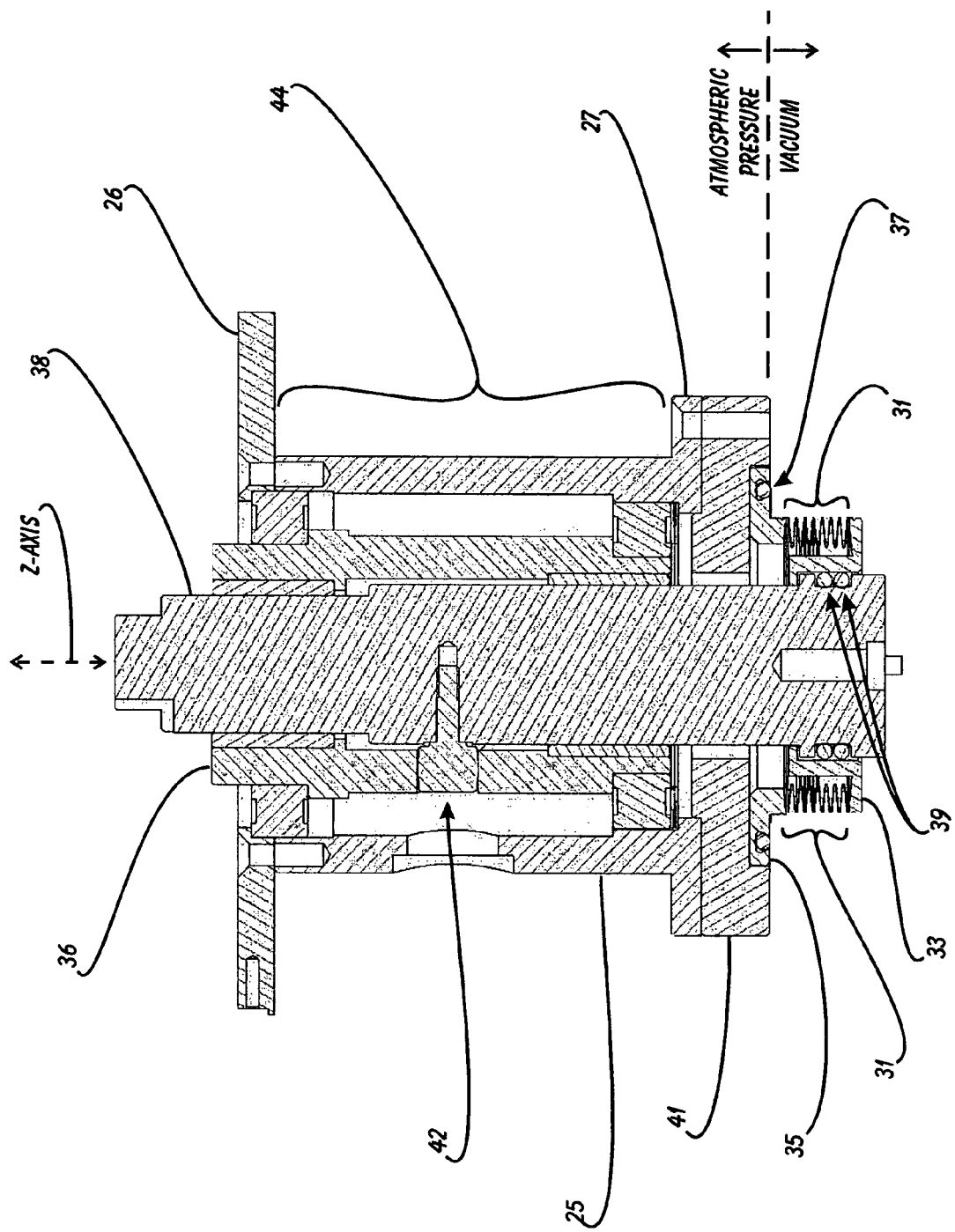
FIG. 5 is a cutaway side view of the plate actuator assembly of FIGS. 1 and 2.

FIG. 4 is a partial cutaway perspective view of the assembly of FIG. 3. As shown, the follower roller 42 extends perpendicular to the axis of the center shaft 38. It should be appreciated that in other embodiments, a worm screw-type arrangement could be created between the center shaft 38 and the sleeve shaft 36 (i.e. a threaded inner surface in the sleeve shaft and a corresponding threaded outer surface of the center shaft 38). In such an arrangement, both shafts 36 and 38 will move in the translational direction, but otherwise the same interdependence (and resultant control benefits) between the two shafts will result. FIG. 5 is a cutaway side view of the plate actuator assembly 14 of FIGS. 1 and 2.

The shaft assembly housing 42 attaches and seals at its top end at the motor base plate 26, and at the bottom end via the flange ring 41 and shaft assembly sealing ring 35. The voids within the internal volume of the shaft assembly housing 25 are in fluid communication with the exterior of the housing 25 (generally atmospheric pressure). Of course, for safety and purity, the valve housing (see FIG. 1) must be sealed from both the exterior of the valve housing and the internal volume of the shaft assembly housing 25. This is accomplished via a combination of bellows and elastomeric seals.

The lower end of the center shaft 38 (i.e. within the valve housing) encircled by a keeper ring 33. There are one or more center shaft seals 39 between the keeper ring 33 and the center shaft 38 to prevent leak-by. A bellows sleeve 31 is attached (typically welded) at its lower end to the keeper ring 33, and at its upper end to a shaft assembly sealing ring 35. The center shaft 38 is encased within a bellows-type sleeve so that the center shaft 38 can move up and down along the z-axis direction, but without the need for a sliding/rotating sealing surface. The bellows sleeve 31 allows the center shaft to move up and down, and confines the sealing elements to be simple O-rings.

The shaft assembly sealing ring 35 seals to the valve housing (see FIG. 1) via a valve housing seal 37, which is stationary. These seals and the bellows sleeve 31 result in the components above the dashed line (plus the interior volume of the bellows sleeve 31) being at atmospheric pressure, while the components below the dashed line are at the same pressure as the interior of the valve housing (under vacuum). This pressure differential causes the keeper ring 33 to be pulled downward towards the shoulder formed near the bottom end of the center shaft 38.

Furthermore, for optimum control purposes, it is desirable to have minimum backlash in the mechanism, that is, no slack in the various linkages transmitting power and motion from the drive motor output shafts to the valve plate 22. A dynamic preload of all mechanical linkages is afforded by the isolation bellows. The pre-loading of the follower roller 42 toward one side of the cam groove 40 is accomplished by the pressure differential by exploiting the pressure differential between extra-bellows (atmospheric) and inter-bellows (chamber vacuum) cavities. Considering that the concentric shafts are under vacuum while the outer mechanism is at atmospheric pressure, a pressure will be exerted on the inner shaft, forcing it downward (as viewed here), thereby forcing the follower roller toward the lower cam follower groove surface. Now, under static conditions, if spur gears 30A and 30B are held in place so that neither can rotate, the downward force of the follower roller onto the lower cam surface will cause a counterclockwise torque on the outer shaft and an equal and opposite (clockwise) torque on the inner shaft. Since the spur gears are being held in place by the two motors 28A, 28B, any slack in the gear linkages will also be taken up. Thus, a preload of the entire mechanism is created, resulting in zero hysteresis in conductance characteristics (as a function of motor position) of the valve.

Figure 6:
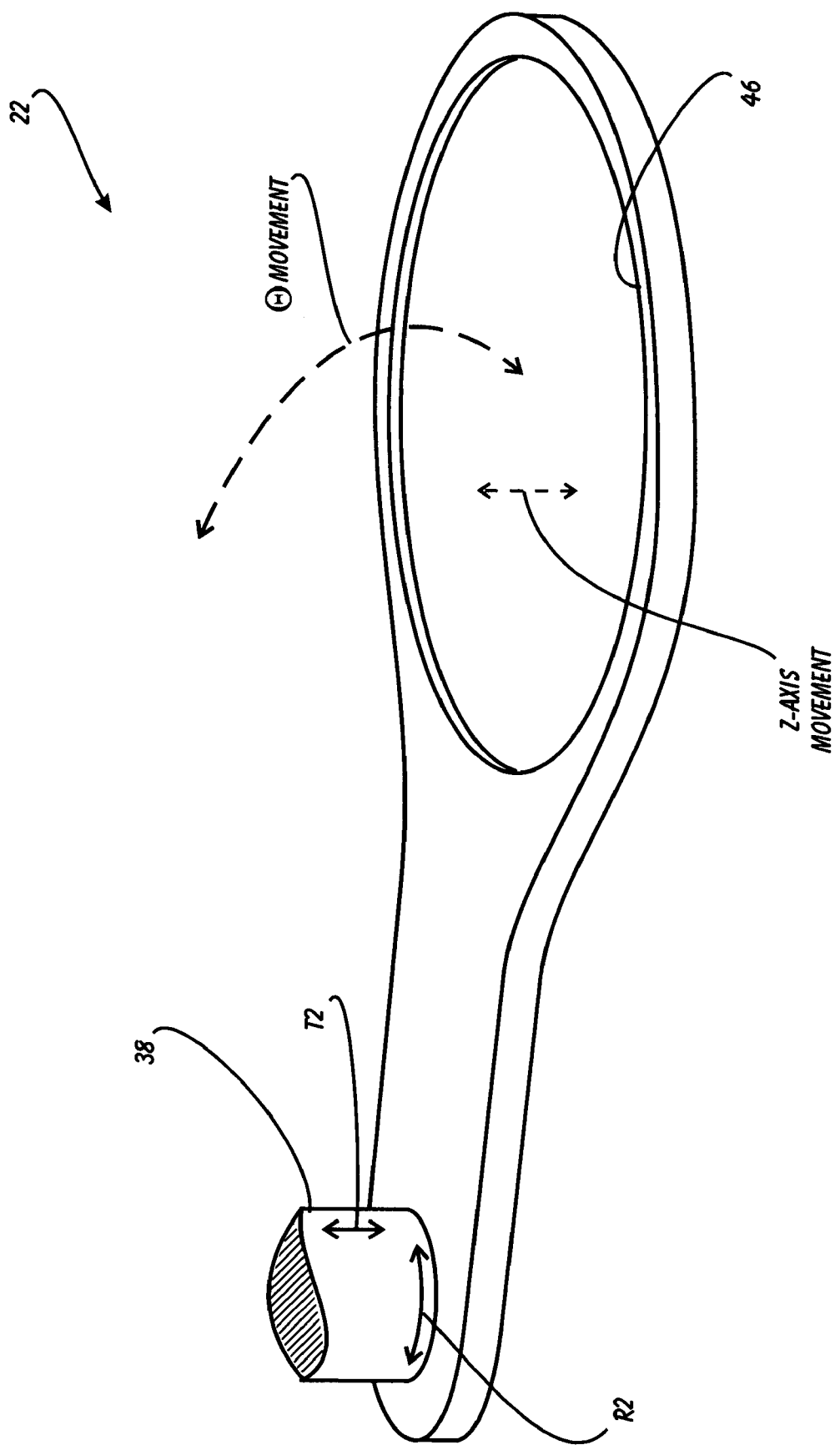
FIG. 6 is a perspective view of the valve plate of the valve assembly of FIG. 1.

With complete, calibrated feedforward compensation for the loads reflected back to the motor output shafts (including torques, coulomb and viscous frictions, and inertias), this pressure differential "preload" is extended to include gear meshes, so that ideal, near-zero total backlash is accomplished dynamically. The loads are calibrated during system initialization to optimize control settings. FIG. 6 indicates how the valve plate 22 is moved by the concentric shaft assembly 44.

FIG. 6 is a perspective view of the valve plate 22 of the valve assembly of FIG. 1. When the center shaft 38 is caused to move in rotational direction R2, the valve plate 22 will move in the theta direction. When the center shaft 38 is caused to move in the translational (not in unison with the sleeve shaft 36) direction T2, the valve plate 22 will also move in the z-axis direction. Also of note in this drawing is the sealing face 46 located at the distal end of the valve plate 22. It is the sealing face 46 (or gaskets associated therewith) that create the seal with the valve housing. Further detail regarding the plate actuator assembly 14 is provided below in connection with FIG. 7.

Figure 7:
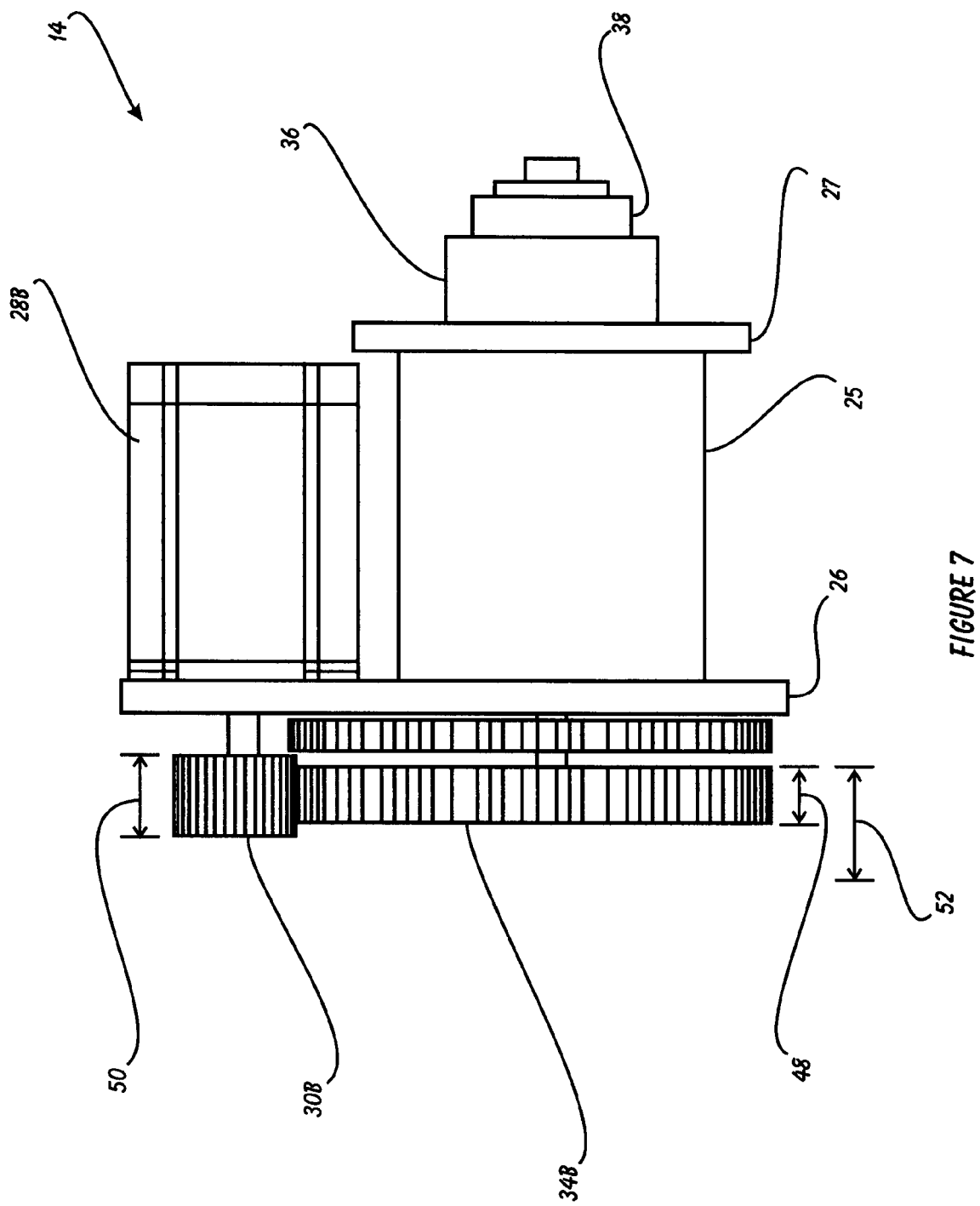
FIG. 7 is a side view of the plate actuator assembly of FIGS. 1, 2 and 5.

FIG. 7 is a side view of the plate actuator assembly 14 of FIGS. 1 and 2. From the side, the differences in tooth width 48 of the second spur gear 34B and the tooth width 50 of the second pinion gear 30B is clearly visible. The tooth width 50 is wider than the tooth width 48. This difference in width is what allows the second spur gear 34B to move in direction 52 while its teeth remain fully engaged with the pinion gear 30B teeth. The same effect is achieved by making tooth width 48 of the second spur gear 34B wider than the too width 50 of the second pinion gear 30B. FIGS. 7A and 7B illuminate the result of this inventive approach to actuating this pendulum valve.

Figure 8B:
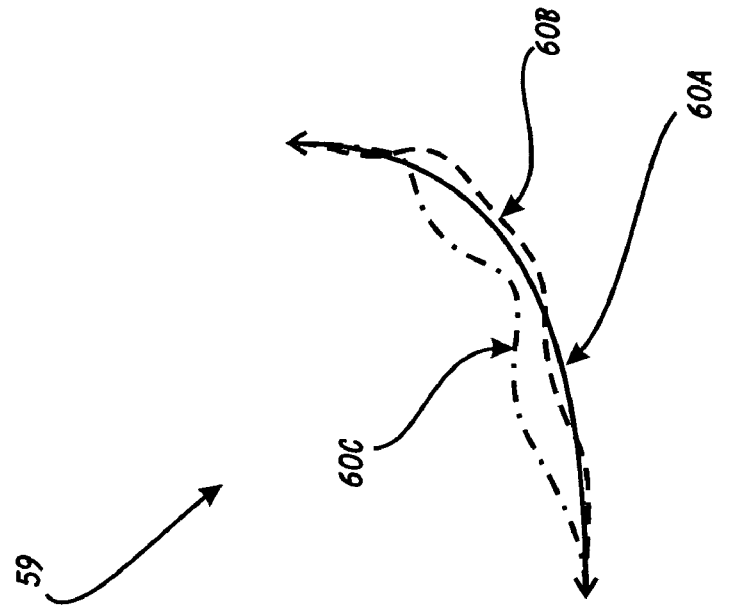
FIGS. 8A and 8B depict the valve plate motion in the prior art valve and the valve assembly of the present invention.
Figure 8A:
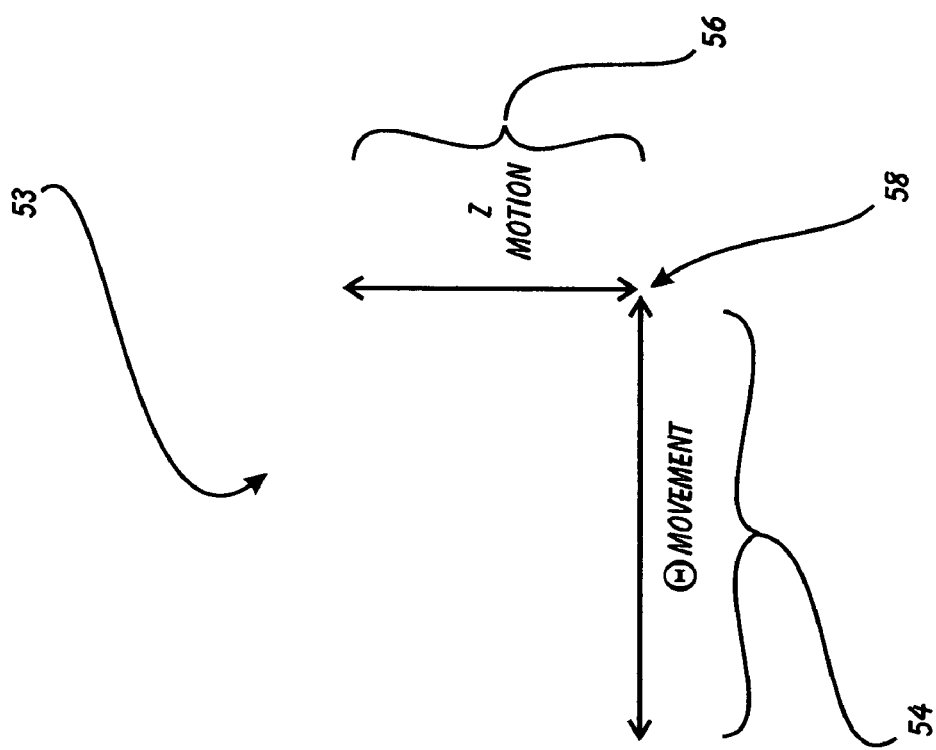

FIGS. 8A and 8B depict the valve plate motion in the prior art valve and the valve assembly of the present invention, respectively. FIG. 8A depicts the conventional "L-motion" characteristics exhibited by the typical prior pendulum valve and actuator. The macro or gross valve movement 54 is conducted in the theta direction (i.e. angular rotation). The final valve seal 56 is achieved in the z-direction motion. The transition point 58 is that point when theta movement stops and z-direction movement begins (or vice-versa).

In contrast, FIG. 8B depicts the valve plate additional mode of interactive motion 59 in the system of the present invention. The motion depicted in the solid line by 60A is best described as "J-motion" because there is no division between the theta direction motion and the z-direction motion. Since both movements can be controlled simultaneously and independently, the movement is only L-shaped if the user desires that movement pattern. What is more likely is that the user will prefer to move the plate through theta and z-directions simultaneously in order to achieve superior chamber flow characteristics as well as very rapid valve actuation speed. Curves 60B and 60C illuminate how the system can control motion of the plate in virtually to move through virtually any motion path, since z-direction and theta-direction movement are totally independent.

Although not depicted here, testing on the valve and actuator of the present invention indicate that in order to optimize valve performance including its ability to throttle flow when nearly closed ("near-closed conductance"), a two-stage sealing ring may be desirable at either the sealing face of the valve plate or at the corresponding valve seat surface on the inside of the valve housing. This "two-stage" valve seal or gasket may define a cross-section that is more complex than a simple circular shape, and further may be made from more than one material of construction such that different sections of the seal (cross-sectional sections) may have different material properties (e.g. elasticity, etc.). The intent of the two-stage seal would be to allow for controllable near-closed conductance as well as sealing to an extremely low conductance when "closed."

Furthermore, because the plate actuator assembly can move the valve in the z-axis without slowing down the response time, it enables the valve housing to be wider (interior flange-to-flange), which in turn allows for greater travel (and throttling range) in the z-direction. Z-direction travel is of particular importance when the valve plate is eclipsing the flow channel (i.e. the plate is positioned over the valve seat, but there is a (z-direction) gap remaining between the valve plate and the valve seat/valve housing. The best, most symmetrical flow conditions can be achieved when throttling flow through a pendulum valve when the valve plate is eclipsing the flow channel. This is because theoretically the flow will surround the entire periphery of the valve seating face (symmetric flow), rather than only a portion of the valve plate as the valve plate moves through the theta direction prior to eclipsing the flow channel. Having a greater gap between the valve plate and the valve seat/valve housing will allow for a greater symmetric throttling range in the z-axis direction. The maximum z-distance available in the prior art pendulum valves has been two (2) millimeters. The valve of the present invention has been tested with a z-distance of up to thirteen (13) millimeters, and has demonstrated superior performance, both in speed of actuation and in quality and range of flow throttling.

Figure 9:
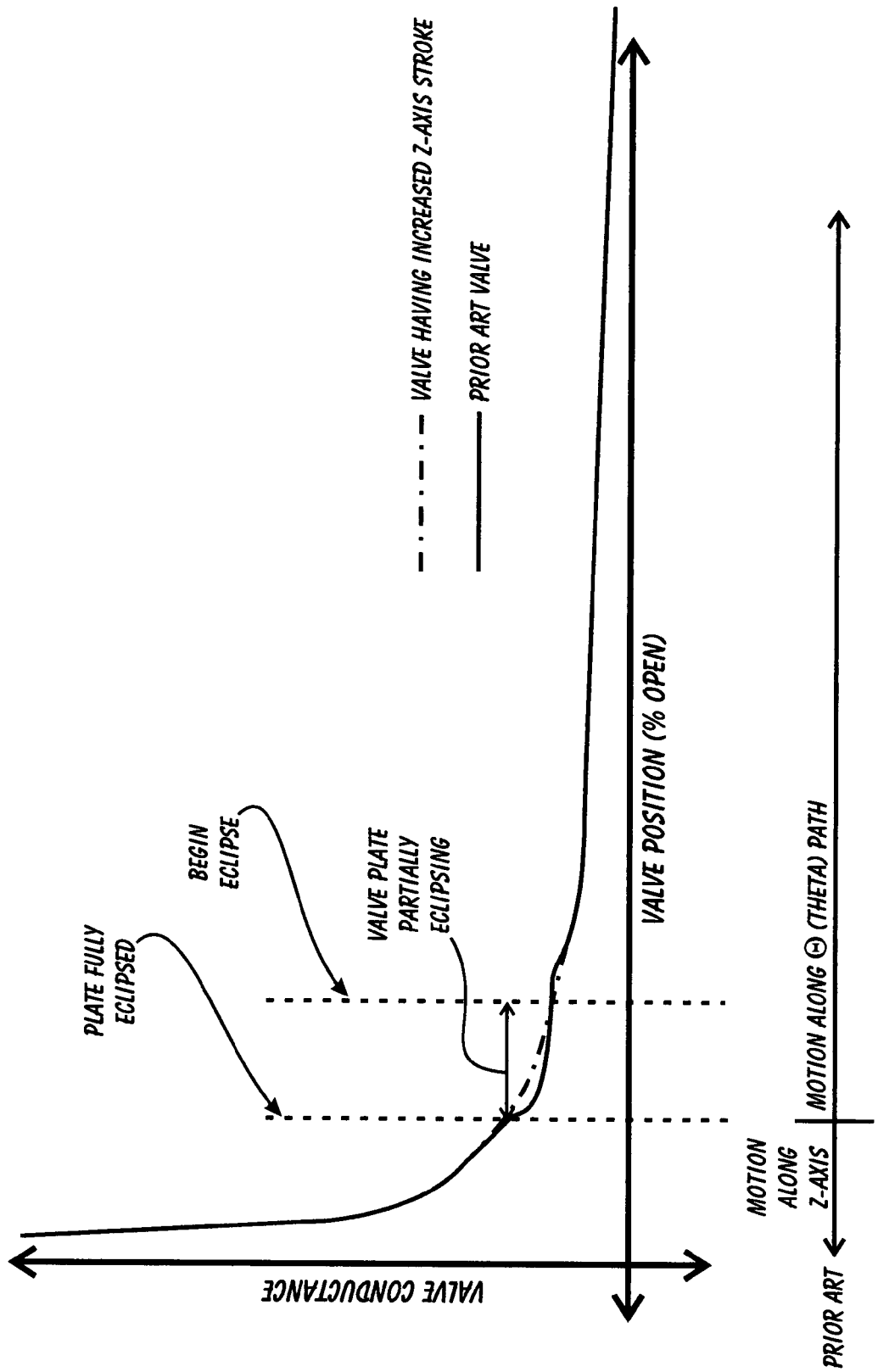
FIG. 9 is a graph depicting the performance benefits of the valve assembly of the present invention.

FIG. 9 is a graph depicting the performance benefits of the valve assembly of the present invention. This graph shows the relationship between the chamber pressure (conductance) and the position of the valve plate expressed in percent of full open. The auxiliary axis depicted below the valve position axis indicates where the conventional pendulum valve plate transitions from moving along only the Θ path, to then moving in the z-axis direction towards closed and sealed. The dashed line to the right is denotes where the edge of the valve plate begins to pass over the valve seat edge (i.e. the edge of the inlet or outlet port of the valve housing). The dashed line to the left denotes when the valve has completed all movement along the Θ path (i.e. the plate is fully eclipsing the valve seat.

This graph is presented to make clear the advantages of the valve of the present invention over the conventional pendulum valve having very limited stroke in the z-axis direction. Because the gap between the valve plate and the valve seat is so tight, there is a flat section in the position vs vacuum curve beginning near where the plate begins and completes the eclipse. This is because the movement of the valve plate through this eclipsing range (without also moving the plate in the z-axis direction) does not create a substantial change in flowrate through the valve. So, while the valve is "closing" as a percentage of being open, it isn't really closing as it relates to throttling flow.

In contrast, the valve of the present invention does two things: (1) it allows the valve plate to move simultaneously and independently in both (or either) the z-axis and the theta directions over the theta motion path; and consequently (2) it enables the prior art "flat" portion to be effectively eliminated by increasing the z-axis gap between the valve plate and the valve seat in the eclipsing range. Furthermore, the actual z-axis vs theta positions can be optimized (i.e. tuned) in-situ so that the smoothest performance curve possible can be achieved.

Although not specifically depicted here, the inventors have further discovered that motion of the valve of the present invention in the z-axis can be controlled very effectively in the positive direction, and even in the opposing direction. Conventionally, pendulum valve seats are oriented on the "upstream" side of the valve housing. As such, z-axis motion towards the seat (i.e. in the "positive z-axis direction") will be opposing any flow through the valve housing. The valve, actuator and control system of the present invention has such high tolerance control of valve plate motion that the valve seat can actually be located on the housing port that is downstream of the valve plate. The benefit of such an orientation is that pressure differential across the valve plate and seat (i.e. in the direction of flow) will work with the valve actuator assembly to provide a more robust seal between the plate and the seat.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A valve assembly, comprising:
    a valve, comprising:
        a housing defined by a pair of coaxial openings in said housing, said openings in spaced relation separated by a distance defined as a flange spacing;
        a valve plate located in said housing, said valve plate defining a first open position, a second eclipsing position and a third sealed position; and
    a plate actuator assembly, comprising:
        a concentric shaft assembly comprising a center shaft within a sleeve shaft, said sleeve shaft comprising a cam groove cut therein, said center shaft attached to said valve plate, said concentric shaft assembly defining three positions, a first open position corresponding to said valve plate first open position, wherein said valve plate is not coaxial with said openings, a second open position corresponding to said valve plate second open position, wherein said valve plate is coaxial with said openings, and a third closed position corresponding to said valve plate third closed position, with said center shaft defined by a follower roller extending therefrom to engage said cam groove; and
        motor means for selectively driving said concentric shaft assembly to each of said three positions by applying separate rotational forces to said sleeve shaft and said center shaft.

2. The assembly of claim 1, wherein:
    said sleeve shaft is defined by an axis, a distal end and an opposing drive end, said sleeve shaft being attached to a first spur gear at said drive end; and
    said center shaft is attached to said valve plate at a driven end and to a second spur gear at an opposing drive end, said center shaft further defined by an axis.

3. The assembly of claim 2, wherein:
    said sleeve shaft cam groove is cut therethrough said sleeve shaft; and
    said center shaft follower roller extending transverse to said axis defined by said center shaft, said follower roller extending into said cam groove.

4. The assembly of claim 3, wherein said plate actuator assembly further comprises:
    a motor base plate;
    a first drive motor attached to said motor base plate and operatively connected to rotate said first spur gear; and
    a second drive motor attached to said motor base plate and operatively connected to rotate said second spur gear.

5. The assembly of claim 4, wherein said sleeve shaft is fixed from moving in said center shaft axis direction and said sleeve shaft can rotate around its own axis.

6. The assembly of claim 5, wherein said center shaft can rotate around its own said axis and can further translate along its own said axis.

7. The assembly of claim 6, wherein:
    moving from said first open position to said second open position requires rotation of said center shaft and moving from said first or second open positions to said third closed position requires translation of said center shaft along said center shaft axis; and
    said first and second drive motors operatively cooperate to move said center shaft in said rotational and translational directions.

8. The assembly of claim 7, further comprising:
    a first pinion gear attached to the shaft of said first drive motor;
    a second pinion gear attached to the shaft of said second drive motor; wherein
    said first pinion gear engages said first spur gear and said second pinion gear engages said second spur gear.

9. The assembly of claim 8, wherein said second pinion gear is defined by a tooth thickness and said second spur gear is defined by a tooth thickness, said pinion gear tooth thickness exceeding said spur gear tooth thickness.

10. The assembly of claim 9, wherein said second pinion gear tooth thickness is at least two millimeters greater than said second spur gear tooth thickness.

11. The assembly of claim 1, wherein said motor means comprises at least two mechanical drive devices, at least one said drive device operatively coupled to move said center shaft and another at least one said drive device operatively coupled to move said sleeve shaft.

12. The assembly of claim 2, wherein said concentric shaft assembly further comprises:
    a housing within which said concentric shafts rotate, said housing defined by a top end and a bottom end;
    a flange ring attached to said bottom end of said housing; and
    a shaft assembly sealing ring attached to between said flange ring and said valve housing.

13. The assembly of claim 12, wherein said concentric shaft assembly further comprises:
    a keeper ring encircling said center shaft; and
    a bellows sleeve interconnecting said shaft assembly sealing ring and said keeper ring to provide a seal therebetween.

14. The assembly of claim 13, further comprising at least one center shaft seal between said keeper ring and said center shaft.

15. A pendulum valve and valve actuator combination, comprising:
    a valve, comprising:
        a housing defined by a pair of openings in said housing, said openings in spaced relation along a Z-axis and separated by a distance defined as a flange spacing;
        a valve plate located in said housing, said valve plate defining a first open position, a second eclipsing position and a third sealed position;
    a plate actuator assembly, comprising:
        a concentric shaft assembly comprising a center shaft within a sleeve shaft, one of either said center shaft or said sleeve shafts attached to said valve plate; and
        motor means comprising at least two motors, one said motor operating on said center shaft and one said motor operating on said sleeve shaft, and motor means for selectively driving said concentric shaft assembly to rotate said center shaft around an axis defined by said center shaft and further to translate said center shaft along said axis.

16. The combination of claim 15, wherein:
said valve plate moving between said first open position and said second open position is defined a theta direction motion, said theta direction motion actuated by rotating said center shaft; and
said valve plate moving between said second open position and said third closed position is defined as a Z-axis direction motion, said Z-axis direction motion actuated by translating said center shaft in a direction parallel to said Z-axis.

17. The combination of claim 16, wherein the distance between said second open position and said third closed position is equal to or greater than two millimeters.

18. A valve actuator comprising:
a motor base plate;
a first motor attached to said base plate;
a second motor attached to said base plate;
a first pinion gear attached to a shaft of said first motor;
a second pinion gear attached to a shaft of said second motor;
a first spur gear engaging said first pinion gear;
a second spur gear engaging said second pinion gear; and
a concentric shaft assembly comprising a sleeve shaft having a circumferential wall and a central bore and a center shaft located in said central bore, said sleeve shaft and said center shaft defining the same axis of rotation, said concentric shaft assembly further comprising transmission means disposed on said shafts to convert relative rotation between said shafts to translational motion of one of said shafts, said transmission means comprising a follower roller extending from one said shaft and engaging an arcuate slot formed in the other said shaft.

19. The valve actuator of claim 18, wherein said transmission means comprises said follower roller extending outwardly from a side wall of said center shaft and engaging said arcuate slot formed though said sleeve shaft.

20. The valve actuator of claim 19, wherein said arcuate slot is configured to prevent translational motion of said shafts when said motors and said gears cause said center shaft and said sleeve shaft to rotate at the same rate.

* * * * *